H. DIPPEL.
HAT FASTENER.
APPLICATION FILED JUNE 14, 1911.
1,037,736.
Patented Sept. 3, 1912.
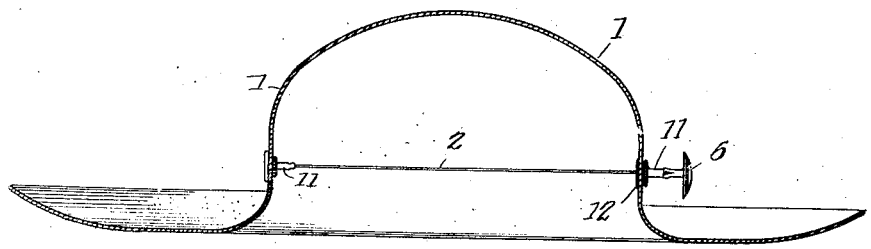
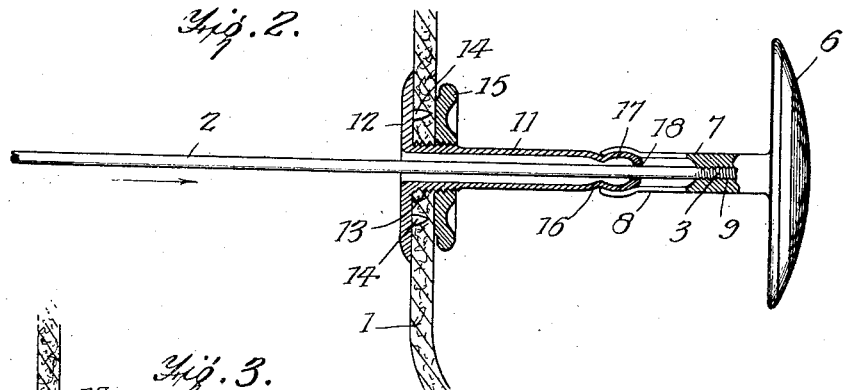
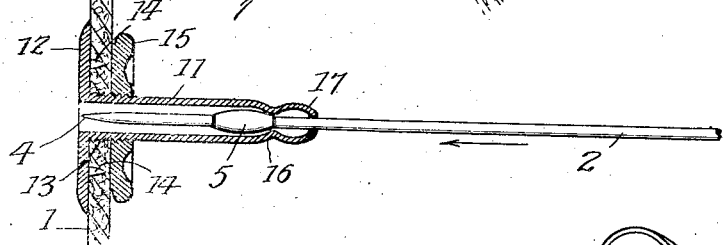
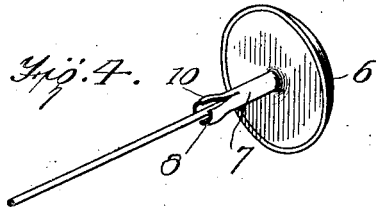
WITNESSES
INVENTOR
HENRY DIPPEL,
BY
ATTORNEYS

UNITED STATES PATENT OFFICE.

HENRY DIPPEL, OF SAN FRANCISCO, CALIFORNIA.

HAT-FASTENER.

1,037,736.  Specification of Letters Patent.  Patented Sept. 3, 1912.

Application filed June 14, 1911. Serial No. 633,001.

*To all whom it may concern:*

Be it known that I, HENRY DIPPEL, a citizen of the United States, and a resident of San Francisco, in the county of San Francisco and State of California, have invented certain new and useful Improvements in Hat-Fasteners, of which the following is a specification.

My invention is an improvement in hat fasteners, and has for its object the provision of a simple, economical, and easily operated device for securing a hat in place on the head of the wearer, which will hold the hat securely in place, while permitting its easy removal when desired.

In the drawings, Figure 1 is a transverse vertical section of a hat with the fastener in place. Fig. 2 is an enlarged partial longitudinal section of the holder for the head end of the pin. Fig. 3 is a similar view of the holder for the point end, and Fig. 4 is a perspective view of the head end of the pin.

The present embodiment of the invention is shown in place in the crown of a hat 1, and comprises a holder for each side of the hat, a pin, and a detachable head for the pin.

The pin consists of a body 2 provided at one end with a threaded portion 3 and at the other end with a point 4. The pin is provided with an enlargement 5 adjacent to the point, the said enlargement being in the shape of an oval integral bulb. The enlargement may be formed by upsetting the material of the pin, or by means of a sleeve soldered or brazed on the pin, or in any other suitable or desired manner.

A head is provided for the pin, the said head consisting of a circular body 6 and a central axially extending shank 7. The shank is solid for a portion of its length adjacent to the body and hollow for the remaining portion as shown. The hollow portion forms a socket 8 for a purpose to be presently described, and the solid portion is provided with a central axial internally threaded opening 9 for engagement by the end 3 of the pin. The socket is split longitudinally at opposite sides, as indicated at 10, in Fig. 4, and the material of the socket is resilient. A holder or fastener is provided for each end of the pin, each holder being secured in place on the crown of the hat. The holders are precisely alike, and each consists of a sleeve 11 provided at one end with an integral annular flange 12 and the sleeve is externally threaded adjacent to the flange, as indicated at 13. The flange is provided with laterally extending teeth or spurs 14 for engaging the material of the hat, and a washer or nut 15 is threaded onto the sleeve for coöperating with the flange to clamp the material of the hat.

The threaded portion 13 of the sleeve is of greater diameter than the remainder of the sleeve, so that the washer may be slipped onto and off the sleeve. The material of the hat is provided with an opening, through which the sleeve is passed, with the flange engaging the face of the hat. Each sleeve is reduced or contracted annularly near the end remote from the flange or head 12, to form a neck 16, and the end of the sleeve is rounded to form a head 17. The bore of the sleeve is reduced at the said end, as indicated at 18, to fit the pin closely.

The fasteners or holders are oppositely arranged, the one adjacent to the head of the pin having its flange or head inside the hat, while the flange or head of the holder at the opposite end of the pin is outside the hat.

The hat is provided with an opening for receiving the sleeve, and the sleeve is passed through the opening until the head or flange engages the material of the hat. The nut is then turned tightly down, forcing the spurs into the hat.

In using the improved pin, after the holders have been placed, the pin is inserted from the left of Fig. 1, until the enlargement 5 of the pin is in contact with the neck 16 of the holder adjacent to the point. The threaded portion of the pin now extends beyond the hat on the opposite side.

The socket of the head is now slipped over the threaded end of the pin, until the portion 3 of the pin engages the threaded opening of the solid portion of the shank. The head is now rotated in the proper direction to engage the portion 3 with the recess 9.

I claim:—

1. In combination a fastener for a hat, comprising a pin provided at one end with a point, and with an enlargement adjacent to the point, and provided at the other end with a threaded portion, a head having a shank provided at its outer end with a resilient split socket, and with a threaded recess at the bottom of the socket for engagement by the threaded portion of the pin, and a holder for each end of the pin having means for engaging the hat, each holder comprising a sleeve adapted to be passed through the side of the hat and having an annular lateral flange for engaging one face of the hat, the flange having lateral spurs for entering the material of the hat, said sleeve having an enlarged threaded portion adjacent to the flange, a washer threaded onto the said portion for engaging the opposite face of the side of the hat, said sleeve being reduced annularly near its other end, said reduction forming a head on one sleeve for engagement by the socket, and an internal neck on the other for engagement by the enlargement near the point of the pin.

2. In combination a fastener for a hat, comprising a pin provided at one end with a point, and with an enlargement adjacent to the point and provided at the other end with a threaded portion, a head having a shank provided at its outer end with a resilient split socket, and with a threaded recess at the bottom of the socket for engagement by the threaded portion of the pin, and a holder for each end of the pin having means for engaging the hat, each holder comprising a sleeve adapted to be passed through the side of the hat and having means at one end for securing it to the hat, one sleeve being reduced near the opposite end to form a head for engaging the socket, and the other sleeve being reduced near the opposite end to form a neck for engaging the enlargement near the point.

3. A hat fastener, comprising a holder or fastener for each side of the hat, each holder comprising a sleeve adapted to be passed through the side of the hat, and having means at one end for securing the holder to the hat, each sleeve having a head at the other end and a neck separating the head from the sleeve, and a pin for engaging the sleeves, said pin having a stop near one end for engaging the neck of one sleeve, and a head having a socket for engaging the head of the other fastener, and having means for detachably engaging the pin.

4. A hat fastener, comprising a sleeve for each side of the hat, each sleeve having means for securing it to the hat, a pin adapted to be passed through the sleeves, each sleeve having a head at one end separated from the sleeve by a reduced neck, said pin having a stop for engaging the neck of one sleeve, and a head having means for detachably engaging the opposite end of the pin and the head of the other sleeve.

5. A hat fastener, comprising a sleeve for each side of the hat, each sleeve having means for securing it to the hat, a pin adapted to be passed through the sleeves, said pin having means at one end for engaging one of the sleeves to prevent movement of the pin toward the other sleeve, and a head engaging the pin outside the other sleeve to prevent movement of the pin in the opposite direction.

HENRY DIPPEL.

Witnesses:
 Oscar Stenborg,
 Charles Dunweber.